United States Patent
Barone et al.

(10) Patent No.: US 9,097,011 B1
(45) Date of Patent: *Aug. 4, 2015

(54) HEAT AND FIRE RESISTANT PLASTIC FOAM

(75) Inventors: Richard J. Barone, Wilton, CT (US); Felix A. Dimanshteyn, West Hartford, CT (US)

(73) Assignee: American Thermal Holdings Company, Saunderstown, RI (US)

( * ) Notice: Subject to any disclaimer, the term of this patent is extended or adjusted under 35 U.S.C. 154(b) by 326 days.

This patent is subject to a terminal disclaimer.

(21) Appl. No.: 12/478,984

(22) Filed: Jun. 5, 2009

(51) Int. Cl.
| | | |
|---|---|---|
| E04B 1/94 | (2006.01) | |
| B05D 3/02 | (2006.01) | |
| C09D 5/18 | (2006.01) | |
| B05D 7/02 | (2006.01) | |
| B05D 1/02 | (2006.01) | |

(52) U.S. Cl.
CPC . *E04B 1/941* (2013.01); *B05D 1/02* (2013.01); *B05D 3/02* (2013.01); *B05D 7/02* (2013.01); *C09D 5/18* (2013.01); *C09D 5/185* (2013.01); *B05D 2201/02* (2013.01); *B05D 2301/10* (2013.01); *B05D 2503/00* (2013.01)

(58) Field of Classification Search
USPC .................. 428/318.4, 318.6, 319.3
See application file for complete search history.

(56) References Cited

U.S. PATENT DOCUMENTS

| | | | |
|---|---|---|---|
| 3,562,197 A * | 2/1971 | Vandersall et al. ........... 524/415 | |
| 4,612,239 A | 9/1986 | Dimanshteyn | |
| 4,871,477 A | 10/1989 | Dimanshteyn | |
| 5,035,951 A | 7/1991 | Dimanshteyn | |
| 2005/0009966 A1* | 1/2005 | Rowen .......................... 524/115 |
| 2006/0160978 A1* | 7/2006 | Gupta et al. .................... 528/44 |
| 2006/0167131 A1* | 7/2006 | Mabey et al. ................. 523/122 |
| 2007/0004838 A1 | 1/2007 | Dimanshteyn et al. |
| 2007/0045598 A1* | 3/2007 | Dimanshteyn et al. ....... 252/601 |
| 2007/0059516 A1* | 3/2007 | Vincent et al. ............. 428/319.1 |
| 2007/0176156 A1* | 8/2007 | Mabey et al. ................. 252/601 |
| 2007/0197686 A1 | 8/2007 | Dimanshteyn et al. |
| 2007/0212495 A1* | 9/2007 | Nuzzo ........................ 427/421.1 |
| 2007/0257226 A1 | 11/2007 | Dimanshteyn |
| 2008/0166484 A1* | 7/2008 | Smith ........................ 427/385.5 |
| 2009/0075539 A1 | 3/2009 | Dimanshteyn et al. |
| 2010/0076098 A1 | 3/2010 | Mabey et al. |

FOREIGN PATENT DOCUMENTS

WO     WO 9111498 A1 * 8/1991
WO     WO 2006005716 A2 * 1/2006

OTHER PUBLICATIONS

GRAFGUARD Technical Data Sheet, 2 pages, 2010.*
Albi Cote FRL Product Data Information, http://www.albi.com/pdfs/FRC/FRL_pdi.pdf (last retrieved on Sep. 7, 2010).

* cited by examiner

Primary Examiner — Hai Vo
(74) Attorney, Agent, or Firm — Leydig, Voit & Mayer, Ltd.

(57) ABSTRACT

A heat and fire resistant system, comprising at least one layer of an intumescent coating applied on at least one surface of a foam substrate. The intumescent coating includes an intumescent catalyst, a carbonific, a blowing agent, expandable graphite, and a binder. A method for rendering a foam substrate resistant to heat and fire, comprising applying at least one layer of intumescent coating composition onto at least one surface of the foamed substrate and allowing the intumescent coating to dry on the foamed substrate. The intumescent coating composition includes an intumescent catalyst, a carbonific, a blowing agent, expandable graphite, and a binder.

43 Claims, 2 Drawing Sheets

COATING C

EXAMPLE 1 COATING

COATING A

COATING B

HEAT AND FIRE RESISTANT PLASTIC FOAM

BACKGROUND

1. Field of the Invention

This disclosure relates generally to heat and fire resistant plastic foam that can be used in building construction and, more particularly, to a heat and fire resistant plastic foam having at least one layer of an intumescent coating comprising expandable graphite for protecting the plastic foam from heat and fire.

2. Background

The effectiveness of plastic foam as a thermal insulation material makes it suitable for an extensive range of insulation applications including residential housing, commercial offices, warehouses, industrial, institutional, and retail buildings, and in refrigeration, aerospace and marine applications. Plastic foam can be used in many construction applications, including flat and pitched roofs, wall cavities, floors, internal linings, composite decks, aircraft cavities, hulls, tunnels, mineshaft ducts, pipes, and storage tanks A drawback of plastic foam is its high flammability. Building codes generally have two requirements for plastic foam. First, the plastic foam should have a flame spread index of less than or equal to 75 and a smoke-developed index of less than or equal to 450 when tested in accordance with ASTM E-84, "Standard Test Method for Surface Burning Characteristics of Building Materials." Second, the plastic foam should have an approved thermal barrier on the habitable side of a structure between the interior of the structure and the plastic foam. Thermal barriers are required for interior surfaces to reduce the risk of a flash fire and to extend the time at which the plastic foam would reach its auto-ignition temperature should a fire originate from other sources.

A common thermal barrier is ⅝ inch gypsum wallboard or drywall placed over the plastic foam. Alternatively, prefabricated sandwich panels of gypsum wallboards or gypsum fiber boards with insulating panels made from plastic foam are used. A drawback for either approach is that the addition of a gypsum wallboard or the construction of a sandwich panel significantly increases the materials cost and associated labor for installation of the gypsum wallboards or sandwich panels.

An alternative to the use of wallboard to provide a thermal barrier is to apply cementitious or cellulosic coatings. To be effective thermal barriers, these materials must generally be sprayed on at thicknesses of greater than or equal to about 50 mil (0.05 in.), requiring several coats. These coatings are not aesthetically pleasing for many exposed indoor environments. The friable nature of these coatings makes them unsuitable for application in an area that receives direct contact, vibrations, or foot traffic.

In general, building codes accommodate an alternative to the requirement for a thermal barrier providing the plastic foam passes a large-scale fire test. Examples of large-scale fire tests are NFPA 286, "Standard Methods of Fire Tests for Evaluating Contribution of Wall and Ceiling Interior Finish to Room Fire Growth"; UL-1715, "Room Fire Test Standard for Interior Finish Materials"; UBC 26-3, "Room Fire Test Standard for Interior of Foam Plastic Systems"; and FM 4880, "Approval Standard for Class 1 Insulated Wall or Wall and Roof/Ceiling Panels, Plastic Interior Finish Materials, Plastic Exterior Building Panels, Wall/Ceiling Coating Systems and Interior or Exterior Finish Systems." These large-scale fire tests are sometimes referred to as "room corner tests" because the ignition source is placed in the corner of a full-scale test room with walls and ceiling made from the system to be tested.

Therefore, an intumescent coating that will enable plastic foam to pass large-scale room corner fire tests is needed. It is highly desirable that the intumescent coating composition can be applied simply and economically with minimal labor costs. It is also desirable that the intumescent coating composition is non-toxic, has low VOC's, is non-friable, and is aesthetically pleasing.

SUMMARY

In one aspect of this disclosure, a heat and flame resistant system is disclosed, comprising a foam substrate and at least one layer of an intumescent coating applied on at least one surface of the foam substrate. The intumescent coating includes an intumescent catalyst, a carbonific, a blowing agent, expandable graphite, and a binder.

In another aspect of this disclosure, a method is disclosed for rendering a foam substrate resistant to heat and fire. The method comprises applying at least one layer of an intumescent coating composition onto at least one surface of the foamed substrate and allowing the intumescent coating to dry. The intumescent coating composition comprises an intumescent catalyst, a carbonific, a blowing agent, expandable graphite and a binder.

In another aspect of this disclosure, the foamed substrate is a plastic foam substrate. The plastic foam substrate may be selected from the group consisting of polyurethane foam, polyisocyanurate foam, polyurethane-modified polyisocyanurate foam, expanded polystyrene foam, extruded polystyrene foam, polyethylene foam and silicone foam.

In another aspect of this disclosure, the at least one layer of intumescent coating comprises ammonium polyphosphate, a polyhydric alcohol, melamine, expanded graphite, and a latex binder.

In another aspect of this disclosure, the foamed plastic substrate further comprises a flame retardant and/or smoke suppressant.

In another aspect of this disclosure, a heat and fire resistant system is disclosed comprising a rigid plastic foam substrate having a density of about 0.5 to about 3.5 lb. per cubic foot (pcf), wherein the plastic foam substrate is selected from the group consisting of polyurethane, polyisocyanurate and polystyrene foam. At least one layer of an intumescent coating having a dry film thickness of about 5 to about 25 mil is applied on at least one surface of the foam substrate. The intumescent coating includes an intumescent catalyst, a carbonific, a melamine blowing agent, expandable graphite and a synthetic latex binder. The intumescent catalyst is selected from the group consisting of diammonium phosphate and monoammonium phosphate, and is present in an amount of about 20 to about 30 wt % of the coating composition. The carbonific includes at least pentaerythritol and chlorinated paraffin wax, and is present in an amount of about 5 to about 15 wt % of the coating composition. The melamine blowing agent is present in an amount of about 5 to about 20 wt % of the coating composition. The expandable graphite is present in an amount of about 0.5 to about 10 wt % of the coating composition. The synthetic latex binder is present in an amount of about 10 to about 30 wt % of the coating composition.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

Figure 1:
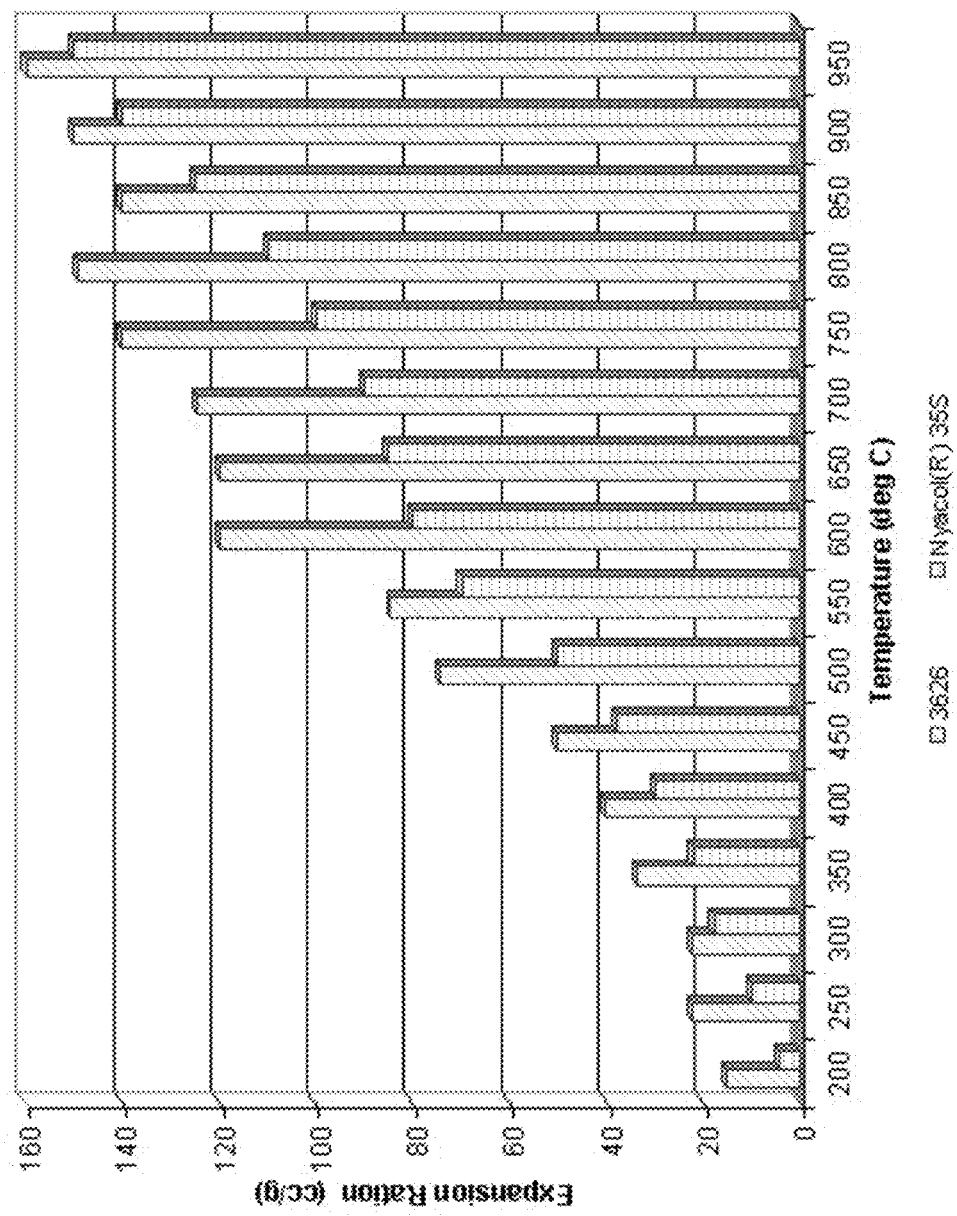
FIG. 1 depicts the expansion ratios for expandable graphites 3626 and Nyacol® 35S as a function of temperature.

It is to be noted that as used herein, the terms "first," "second," and the like do not denote any order or importance, but rather are used to distinguish one element from another. As used herein, the singular forms "a", "an" and "the" do not denote a limitation in quantity. Instead, they are intended to include the plural forms as well, unless the context clearly indicates otherwise. Furthermore, all ranges disclosed herein are inclusive of the endpoints and independently combinable. The terminology used herein is for the purpose of describing particular embodiments only and is not intended to be limiting of the invention. It will be further understood that the terms "comprises" and/or "comprising," when used in this specification, specify the presence of stated features, integers, steps, operations, elements, components, and/or groups, but do not preclude the presence or addition of one or more other features, integers, steps, operations, elements, components, and/or groups thereof It has unexpectedly been found that plastic foam can be protected from heat and fire by application of one or more coats of an intumescent coating composition comprising an intumescent catalyst, a carbonific, a blowing agent, expandable graphite, and a binder. The expandable graphite, in particular, improves the heat and fire resistance of the system comprising the coating and plastic foam substrate, extends the time to failure, and extinguishes flames after removal of an ignition source, all in comparison to an intumescent coating composition lacking expandable graphite.

Graphite is a useful additive for flame retardant compositions. It is resistant to oxidation up to about 850° F. and, in the absence of air, is thermally stable at temperatures in excess of 5000° F. Expandable graphite is particularly useful, as it is, by itself, an intumescent material. In the intumescent coating composition disclosed herein, expandable graphite enhances the intumescence obtained from the combination of an intumescent catalyst, carbonific and blowing agent. Expandable graphite also inhibits flames at the surface of the coating. Without being limited to any particular theory, the flames observed on the surface of the coating are the result of combustion of volatile decomposition products released from the plastic foam. In fire tests, these flames can persist after removal of the ignition source and can be observed in radiant panel tests.

A heat and fire resistant system comprising polyurethane foam with a layer of the intumescent coating composition applied on the exposed surface of the foam is capable of passing large scale room corner fire tests, such as, for example, NFPA 286. In particular, the system disclosed herein satisfies the criteria set forth in the 2006 International Building Code (IBC), Section 2603, "Interior Finish and Trim", Subsection 9, "Special approval", IBC Section 803, "Wall and Ceiling Finishes", Subsection 2.1, "Acceptance Criteria", and International Residential Code (IRC), Section 314, "Foam Plastic", Subsection 3, "Surface burning characteristics." In addition to its fire retardant qualities, the preferred intumescent coating composition is water-borne, has very low VOC (less than 50 g/L), and is free of toxic components, such as (but not limited to) polybrominated aromatics, antimony trioxide, cadmium, lead, mercury, and other heavy metals, urea-formaldehyde resins, melamine formaldehyde resins, and organic solvents.

In one embodiment, the plastic foam can be polyurethane foam, polyisocyanurate foam, polyurethane-modified polyisocyanurate foam, expanded polystyrene foam, extruded polystyrene foam, polyethylene foam, silicone foam, or the like, or a combination of at least one of the foregoing plastic foams. The plastic foam can be in the form of a pre-manufactured panel, or can be spray-applied at the construction site. Foam panels are generally made from polyisocyanurate, polyurethane-modified polyisocyanurate, expanded polystyrene, extruded polystyrene, polyethylene, or the like, or combinations of at least one of the foregoing plastic foams.

In another embodiment, the plastic foam is preferably a spray-applied polyurethane foam. Spray-applied polyurethane foam may be produced by mixing a polyisocyanate ("A" component) with a polyol ("B" component) on-site in the nozzle of a spray gun. Spray guns suitable for mixing and spraying polyurethane foam are manufactured by, for example, Graco Inc. (Minneapolis, Minn.) and GlasCraft (Indianapolis, Ind.). The polyisocyanate may be polymeric diphenylmethane diisocyanate (PMDI). The polyol may be a polyester polyol, a polyether polyol, or a combination of both. The B component also preferably comprises a blowing agent, catalyst, and silicone surfactant to form the B component. Examples of blowing agents include (but are not limited to) water, chlorofluorocarbon, hydrofluorocarbon, pentane, or the like, or a combination of at least one of the foregoing blowing agents.

Spray-applied polyurethane foam can be open cell or closed cell. Closed cell spray-applied polyurethane foam has a preferred density of about 1.8 to about 7.0 lb. per cubic foot (pcf), and more preferably from about 1.8 to about 3.5 pcf. Open cell spray-applied polyurethane foam has a preferred density of about 0.5 to about 1.8 pcf. Open cell foam is generally more economical than closed cell foam due to its lower density, but closed cell foam is a better insulator per unit thickness of foam.

In one embodiment, the plastic foam comprises a flame retardant and/or smoke suppressant. Examples of flame retardants include (but are not limited to) chlorinated organic compounds and polymers, brominated organic compounds and polymers, phosphate esters, chloroalkyl phosphate esters, phosphonate esters, expandable graphite, hydrated metal oxides, and ammonium salts of phosphoric acid, polyphosphoric acid, sulfuric acid, and hydrochloric acid. Specific examples of flame retardants are chlorinated paraffins, tetrabromophthalate esters, decabromodiphenyl oxide, tetrabromo benzoate esters, tetrabromobisphenol A, tetrabromobisphenol A ethers, poly(dibromostyrene), hexabromocyclodecane, decabromodiphenylethane, 2,4 6-tribromophenol, bis(2,4,6-tribromophenoxy)ethane, triethyl phosphate, tris (2-chloroisopropyl)phosphate, tris(1,3-dichloroisopropyl) phosphate, tris(2-chloroethyl)phosphate, diethyl N,N-bis(2-hydroxyethyl)aminoethyl phosphonate, cresyl diphenyl phosphate, tricresyl phosphate, trixylyl phosphate, isopropylated triaryl phosphates, bisphenol A bis(diphenyl phosphate), resorcinol bis(diphenyl phosphate), ammonium polyphosphate, melamine, melamine polyphosphate, melamine cyanurate, alumina trihydrate, magnesium hydroxide, sodium decaborate decahydrate, zinc borate hydrate, ammonium pentaborate, monoammonium phosphate, diammonium phosphate, ammonium sulfate, ammonium bisulfate, ammonium chloride, antimony trioxide, sodium antimonate, or the like, or a combination comprising at least one of the foregoing flame retardants. More specific examples of flame retardants are tris(2-chloroisopropyl)phosphate, tetrabromophthalate esters, expandable graphite, alumina trihydrate, ammonium sulfate, or the like, or combinations of one or more of the foregoing flame retardants.

The flame retardant is generally used in an amount of about 1 to about 50 weight percent (wt %), specifically about 1 to about 30 wt %, and more specifically about 2 to about 20 wt %, based on the total weight of the foam composition.

In one embodiment, the intumescent coating composition preferably comprises an intumescent catalyst, a carbonific, a blowing agent, expandable graphite, and a binder. The intumescent catalyst releases ammonia and phosphoric acid when exposed to the heat of a fire. The phosphoric acid reacts with the hydroxyl groups of a polyhydric alcohol (carbonific) to generate phosphate esters, which decompose to a carbon char, water, and carbon dioxide. The release of gases from the blowing agent causes expansion of the carbon char to form a cellular structure.

Examples of intumescent catalysts include (but are not limited to) monoammonium phosphate, diammonium phosphate, monopotassium phosphate, ammonium polyphosphate, ammonium borate, ammonium sulfate, metaphosphoric acid, orthophosphoric acid, pyrophosphoric acid, hypophosphorous acid, melamine phosphate, melamine pyrophosphate, melamine polyphosphate, urea phosphate, or the like, or combinations of one or more of the foregoing intumescent catalysts.

A specific, preferred intumescent catalyst is substantially water-insoluble ammonium polyphosphate having polymeric P-O-P linkages, essentially no P-N-P linkages, and essentially no orthophosphate, pyrophosphate, or short-chain P-O-P linkages. Essentially all of the nitrogen is in the form of ammonium ions. The ammonium polyphosphate has structure (I), $$(NH_4)_{n+2}P_nO_{3n+1} \qquad (I)$$

wherein n is an integer having an average value of about 1000 to about 3000. Commercial ammonium polyphosphate has a solubility of about 1 to about 5 g per 100 mL when measured by slurrying 10 g of ammonium polyphosphate in 100 mL of water for 60 minutes at 25° C.

The intumescent catalyst is preferably used in an amount of about 1 to about 60 wt %, specifically about 10 to about 40 wt %, and more specifically about 20 to about 30 wt %, based on the total weight of the coating composition.

The carbonific is a material that decomposes at elevated temperatures to form a fire-resistant char comprising primarily carbon. Examples of carbonifics include (but are not limited to) polyhydric compounds, polyols, polysaccharides, starches, dextrins, sugar alcohols, reducing sugars, hexane hexols, pentane pentols, and chlorinated paraffin waxes. Specific examples of carbonifics include (but are not limited to) mannitol, sorbitol, dulictol, inositol, arabitol, pentaerythritol, dipenterythritol, tripentaerythritol, sucrose, glucose, maltose, erythritol, pentaerythritol, di pentaerythritol, tri pentaerythritol, sorbitol, starches, dextrose, Chlorowax® 700 (available from Dover Chemical Corp., Dover, Ohio), Chlorez® 700 (also available from Dover Chemical Corp.), or the like, or a combination of at least one of the foregoing carbonifics. Chlorowax 700 and Chlorez 700 are chlorinated paraffin waxes having the chemical formula $C_{24}H_{28}Cl_{22}$, a chlorine content of 71.5 wt %, a softening point of 103° C., and a specific gravity of 1.66 at 25° C.

The carbonific is preferably used in an amount of about 1 to about 50 wt %, specifically about 5 to about 30 wt %, and more specifically about 10 to about 15 wt %, based on the total weight of the coating composition.

The blowing agent provides one means for the expansion of the carbon char to form an insulating cellular structure. The blowing agent increases the thickness of the carbon char when exposed to fire or heat by decomposition and concurrent evolution of a non-combustible gas. The expansion of the carbon char and formation of a cellular structure enhances the insulating properties of the coating. Furthermore, the blowing agent absorbs energy when it evolves a gas, thereby removing energy from the surface and cooling the substrate. The non-combustible gas also dilutes the concentrations of combustible gasses that are produced in a fire and dilutes the concentration of oxygen in the atmosphere adjacent to the substrate. Examples of blowing agents include (but are not limited to) melamine, melamine polyphosphate, melamine cyanurate, dicyandiamide, urea, dimethylurea, guanidine, cyanoguanidine, glycine, chlorinated paraffin wax, Chlorowax 700, Chlorez 700, alumina trihydrate, magnesium hydroxide, zinc borate hydrate, or the like, or a combination of at least one of the foregoing blowing agents.

The blowing agent is preferably used in an amount of about 0.1 to about 50 wt %, specifically about 1 to about 30 wt %, and more specifically about 5 to about 20 wt %, based on the total weight of the coating composition.

In one embodiment, the coating composition preferably comprises a mixture of blowing agents with different decomposition temperatures. An example of the mixture of blowing agents includes (but is not limited to) at least one nitrogen-containing blowing agent, and at least one chlorine-containing blowing agent. A specific combination is preferably melamine and Chlorez® 700. Melamine sublimes above about 200° C., and decomposes above about 280° C., liberating ammonia gas. Chlorez® 700 decomposes above about 180° C., liberating hydrochloric acid gas.

The expandable graphite is formed from crystalline graphite, which is composed of stacks of parallel layers of carbon atoms. The expandable graphite is formed by treatment of crystalline graphite with intercalants, such as, for example, sulfuric acid and/or nitric acid, which are deposited between the layers of carbon atoms. When the expandable graphite is exposed to a flame or heat source having a temperature of about 150° C. or greater, the intercalants decompose and release gases. The expandable graphite layers are forced apart by the gas, thereby creating a low density, non-combustible, thermally insulating material. The graphite expands from about 4 to about 200 times its unexpanded volume, depending upon the temperature. Exemplary expandable graphites include (but are not limited to) 3626, available from Anthracite Industries (Sunbury, Pa.), and Nyagraph® 35S, available from Nyacol Nano Technologies, Inc. (Ashland, Mass.).

The expandable graphite has a preferred particle size range of about 0.1 to about 5000 micrometers (μm), specifically about 1 to about 2000 μm, and more specifically about 10 to about 500 μm.

The expandable graphite preferably has a maximum expansion ratio of about 10 to about 400 cubic centimeters per gram (cc/g), specifically about 50 to about 300 cc/g, and more specifically about 100 to about 200 cc/g. The maximum expansion ratio is measured at 950° C. The expansion ratios for expandable graphite 3626 and Nyacol® 35S as a function of temperature are illustrated in FIG. 1.

The expandable graphite is preferably used in an amount of about 0.1 to about 20 wt %, specifically about 0.5 to about 10 wt %, and more specifically about 1 to about 5 wt %, based on the total weight of the coating composition.

The expandable graphite particles are readily friable and are, therefore, susceptible to size reduction in intumescent coating mixing operations. In the preferred method of making the intumescent coating composition, the expandable graphite is preferably added in the letdown step. Subsequent mixing is preferably conducted under low shear conditions such that the average particle size of the expandable graphite is not decreased, and such that the particle size distribution is not altered.

The binder provides a continuous coating film that binds the other components of the coating composition together upon drying. The binder may be a thermoplastic polymer, a thermosetting polymer, or a combination of both. The binder may be water-borne or solvent-borne. Water-borne binders are dissolved or dispersed in water. Latex binders are colloidal dispersions of polymer particles in water. Synthetic latex binders comprise polymers of vinyl acetate, methyl methacrylate, ethyl acrylate, butyl acrylate, 2-ethylhexyl acrylate, 2-hydroxyethyl acrylate, glycidyl methacrylate, methacrylic acid, acrylic acid, acrylic acid, styrene, butadiene, or the like, or combinations of the foregoing monomers. Examples of synthetic latex binders include (but are not limited to) acrylic latex, vinyl acrylic latex, styrene acrylic latex, styrene butadiene latex, or the like, or combinations of the foregoing synthetic latex binders. The foregoing binders are commercially available from Union Carbide Corp. (Houston, Tex.) under the trade name UCAR™ 367, and from StanChem, Inc. (East Berlin, Conn.).

The binder is preferably an aqueous colloidal dispersion of polymer particles having particles diameters of about 0.001 to about 10 μm, specifically about 0.01 to about 10 μm, and more specifically about 0.05 to about 1 μm.

The binder is preferably used in an amount of about 1 to about 50 wt %, specifically about 5 to about 40 wt %, and more specifically about 10 to about 30 wt %, based on the total weight of the coating composition.

The coating composition may be brushed, rolled on, sprayed, or applied by dip-coating. The coating composition may be applied by airless or air spray equipment. The thickness of the coating layer may be controlled by varying the rate of movement of the spray nozzle along the substrate, or by varying the rate of spraying. The coating may be applied in a single layer, or in a plurality of layers. The dried coating film thickness is preferably about 1 to about 100 mil, more preferably about 5 to about 40 mil, and more preferably about 10 to about 20 mil thick.

The composition and method of using the invention will now be described by the following representative examples. These examples are not to be construed as limiting the scope of the invention as these and other equivalent embodiments will be apparent in view of this disclosure and appended claims.

Example 1

Intumescent Coating Composition

The components and amounts thereof for the intumescent coating composition are provided below in Table 1. Water, potassium tripolyphosphate, Surfactol® 365, SC-5184, Rhodoline® 677, PhosChek® P30, melamine, dipentaerythritol, Busan 1024, titanium dioxide, and Chlorez® 700 were mixed in a pebble mill for greater than or equal to 8 hours. The resulting suspension had a Hegman value of 3-4, and a viscosity of 100-110 Krebs Units (KU), as measured using a KU Digital Viscometer at a temperature of 25° C.

The suspension was transferred to a vessel and mixed with a stirring shaft equipped with a Cowles impeller under low shear conditions. SC-5184, Rhodoline® 677, Graphite 3626, and a 16.7% solution of EBM-1000 in water are added, and the resulting mixture mixed for 30 min. to form the coating composition. The viscosity was 100-110 KU.

TABLE 1

INTUMESCENT COATING COMPOSITION

| MATERIALS | AMOUNT (LBS) | % WT. |
|---|---|---|
| Step 1. Pebble mill or Cowles blade grind | | |
| Water | 252 | 25.2 |
| Potassium Tripolyphosphate | 3 | 0.3 |
| SURFACTOL ® nonionic surfactant from CasChem, Inc. (Bayonne, NJ) | 4 | 0.4 |
| SC-5184 vinyl/acrylic latex from StanChem, Inc. (E. Berlin, CT) | 71 | 7.1 |
| Rhodoline ® 677 from Rhodia (Cranbury, NJ) | 2 | 0.2 |
| PhosCheck ®-P30 from ICL Performance Products LP (St. Louis, MO) | 248 | 24.8 |
| Melamine | 76 | 7.6 |
| Dipentaerythritol | 71 | 7.1 |
| Busan 1024 from Buckman Laboratories (Memphis, TN) | 1 | 0.1 |
| Titanium Dioxide | 57 | 5.7 |
| Chlorez 700 from Dover Chemical Corp. (Dover, OH) | 38 | 3.8 |
| Step 2. Letdown | | |
| SC-5184 | 139 | 13.9 |
| Rhodoline ® 677 | 1 | 0.1 |
| Graphite 3626 from Anthracite Industries (Sunbury, PA) | 25 | 2.5 |
| Bermocol EBM-1000 from Akzo Nobel (Chicago, IL)/Water | 2/10 | 0.2/1.0 |

Example 2

Fire Testing of Coating Compositions

In this test, the coating composition of Example 1 was compared to the following off-the-shelf intumescent coating compositions:
COATING A PTP DC333 from International Fireproof Technology, Inc. (Irvine, Calif.)
COATING B FC No. 50-50 Intumescent Ignition Barrier Coating for Polyurethane Foam Kote from Flame Control Coatings, LLC (Niagara Falls, N.Y.)
COATING C CK258 Fire Proof Paint from International Carbide Technology Co., Ltd. (Taoyuan, Taiwan)

Draw-downs were done on 6 inch×4 inch aluminum coupons. The wet film thickness in each case was 30 mils. The coatings were allowed to air dry at 22° C. for 20 hours and then dried in an oven at 120° C. for 4 hours. The coated coupons were positioned vertically for fire testing. Testing was carried out using a hand-held propane torch. The flame was adjusted to a length of 2 inches and positioned perpendicular to the coating surface, with the tip of the flame just touching the surface of the coating. The time to coating failure, which was defined as cracking and disintegration of the surface crust of the intumescent foam, was measured.

Figure 2:
FIG. 2 shows intumescent coatings 1, 2, 3 and 4 after exposure to a propane flame.
Figure 2:
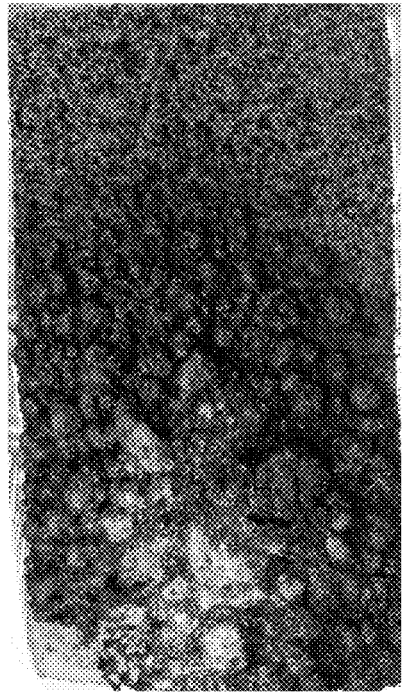
Figure 2:
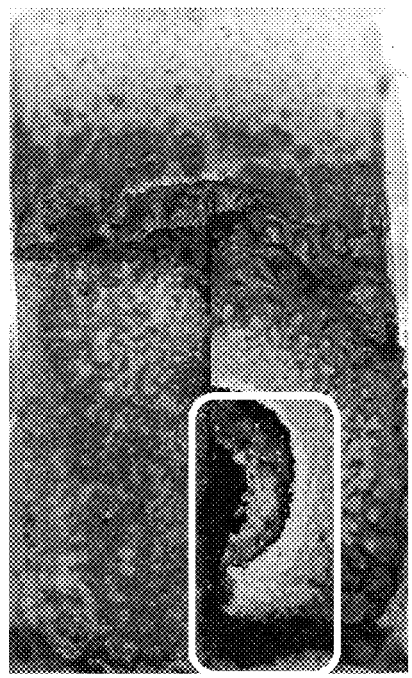
Figure 2:
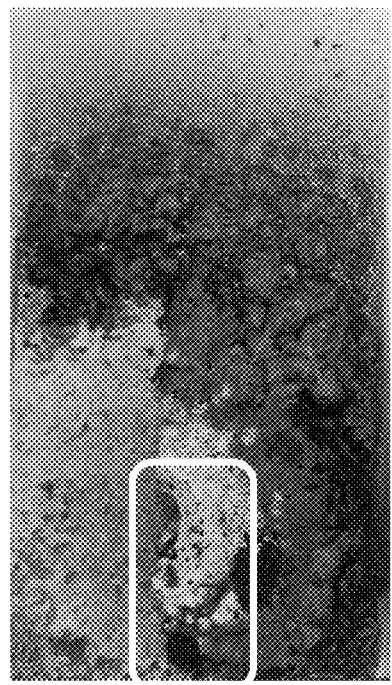

All coatings (Example 1 coating, Coating A, Coating B and Coating C) were tested for 2 minutes, 30 seconds. Comparative Coatings A and B each failed in 1 minute, 30 seconds, and comparative Coating C failed in 30 seconds. The crust of the coating of Example 1, on the other hand, was still intact after 2 minutes, 30 seconds. Photographs of the intumesced comparative Coatings A, B, and C, and the coating of Example 1 after testing are shown in FIG. 2. A large opening can be seen in the crust of Coating C. Half of the intumesced coatings of Coatings A and B were removed for analysis. However, semicircular openings resembling parts of craters are visible on the right side of the photographs labeled Coating A and Coating B. The damaged crust is designated by the white rectangles with rounded edges in the photographs.

Example 3

NPFA 286 Testing of Closed Cell Heat & Fire-Resistant Foam

The test was conducted by Intertek Testing Services NA, Inc. of Elmendorf, Tex. Intertek is an accredited test facility in compliance with ANS/ISO/IEC Standard 17025:2005, "General criteria for the competence of testing and calibration laboratories." The test was conducted following the guidelines of NFPA 286, "Standard Methods of Fire Tests for Evaluating Contribution of Wall and Ceiling Interior Finish to Room Fire Growth."

Fabrication of Test Room

The test specimen consisted of a wood stud and joist room with 2×4 inch studs placed apart 16 inches on center, and with $15/32$ inch plywood backing. The four walls were at right angles. The interior dimensions were 8 feet high×8 feet wide× 12 feet deep. The test room contained one 30×80 inch doorway in the center of one of the 8×8 ft walls. No other openings were present. Ceiling joists ran parallel to the long dimension of the room, toward the door. The test room was lined on the outside with ⅝ inch plywood. A standard closed cell, 2 pcf polyurethane spray foam was applied to the interior of the room to a depth of 4.5 inches. Protruding areas of foam were trimmed to achieve a uniform foam thickness. After 18 days of equilibration, the intumescent coating composition of Example 1 was applied by airless spraying. Average dry film thickness was 16 mil. The test was conducted 6 days later.

An exhaust hood with face dimensions of 10 feet×10 feet with a depth of 3.5 feet was placed immediately adjacent to the door of the test room. The ignition source for the test was a gas burner with a nominal 12 inch×12 inch porous diffusion surface of refractory material on top. The burner was positioned 12 inches above the floor and such that two edges of the porous top surface were 1 inch from both walls in the left corner of the room opposite the doors. The burner was supplied with C.P. grade propane gas. The burner was ignited to commence the test. It delivered 40 kilowatts of heat for 5 minutes, followed by 160 kilowatts of heat for 10 minutes, and was then turned off.

Results

Low levels of heat release and low upper level temperatures were obtained. The heat flux on the floor did not reach flashover levels. Flames did not spread to the ceiling during the 40 kilowatt exposure. The flame did not spread to the extremities of the right 12-foot wall or of the rear 8-foot wall at any time during the test. Flashover was not observed. The total smoke release was well below 1,000 square meters. Based on these results, the wall structure met the acceptance criteria set forth in the 2003 International Building Code (IBC), Section 803.2.

Example 4

NPFA 286 Testing of Open Cell Heat & Fire-Resistant Foam

The test was conducted by Intertek Testing Services NA, Inc. of Elmendorf, Tex. The test was conducted following the guidelines of NFPA 286, "Standard Methods of Fire Tests for Evaluating Contribution of Wall and Ceiling Interior Finish to Room Fire Growth."

Fabrication of Test Room

The test specimen consisted of a wood stud and joist room with 2×8 inch studs placed apart 48 inches on center and 2×12 joists placed 24 inches on center with a $15/32$ inch plywood backing. The four walls were at right angles. The interior dimensions were 8 feet high×8 feet wide×12 feet deep. The test room contained one 30×80 inch doorway in the center of one of the 8×8 ft walls. No other openings were present to allow ventilation. Ceiling joists ran parallel to the short dimension of the room. The test room was lined on the outside with ⅝ inch type X gypsum wallboard. A standard open celled, spray-applied, semi-rigid polyurethane spray foam was applied to the interior of the room to a depth of 5.5 inches on the walls and 10 inches on the ceiling. An intumescent coating composition substantially the same as that shown in Example 1 was applied by airless spraying to cover the wall foam, studs, ceiling foam and joists. Average dry film thickness was 14 mil.

The ignition source for the test was a gas diffusion burner positioned 12 inches above the floor and such that two edges of the porous top surface were 1 inch from both walls in the left corner of the room opposite the door. The burner was ignited at a fuel flow rate known to produce 40 kilowatts of heat output. This 40 kilowatts of heat output was maintained for 5 minutes, followed by 160 kilowatts of heat output for 10 minutes, after which time the burner was turned off.

Results

Low levels of heat release and low upper level temperatures were obtained. No flames exited the test chamber. The heat flux on the floor did not reach flashover levels. Flames did not spread to the ceiling during the 40 kilowatt exposure. The total smoke release was well below 1,000 square meters. Based on these results, the specimen met the acceptance criteria set forth in the 2003 and 2006 International Building Code (IBC), Section 803.2.1.

While the invention has been described with reference to these exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:
1. A heat and fire resistant system, comprising:
a foam substrate; and
at least one layer of an intumescent coating directly applied to at least one surface of the foam substrate, the intumescent coating consisting essentially of an intumescent catalyst, a carbonific, a blowing agent, expandable graphite, a surfactant, and a latex binder, wherein the intumescent catalyst is present in an amount of about 1 to about 60 wt % of the total weight of the coating composition, the intumescent catalyst selected from the group consisting of monoammonium phosphate, diammonium phosphate, monopotassium phosphate, ammonium polyphosphate, ammonium borate, ammonium sulfate, metaphosphoric acid, orthophosphoric acid, pyrophosphoric acid, hypophosphorous acid, melamine phosphate, melamine pyrophosphate, melamine polyphosphate, urea phosphate, and combinations thereof;

wherein the carbonific is present in an amount of about 1 to about 50 wt % of the total weight of the coating composition, the carbonific selected from the group consisting of polyhydric alcohol, polyhydric compounds, polyols, polysaccharides, starches, dextrins, sugar alcohols, reducing sugars, hexane hexols, pentane pentols, mannitol, sorbitol, dulictol, inositol, arabitol, pentaerythritol, dipentaerythritol, tripentaerythritol, sucrose, glucose, maltose, erythritol, dextrose, and combinations thereof;

wherein the blowing agent is present in an amount of about 0.1 to about 50 wt % of the total weight of the coating composition, the blowing agent selected from the group consisting of melamine, melamine cyanurate, dicyandiamide, urea, dimethylurea, guanidine, cyanoguanidine, glycine, chlorinated paraffin wax, alumina trihydrate, magnesium hydroxide, zinc borate hydrate, and combinations thereof;

wherein the latex binder, free of thermoplastic polymers, has a polymer particle diameter of about 0.001 to about 10 µm and is present in an amount of about 1 to about 50 wt % of the total weight of the coating composition;

wherein the expandable graphite is present in an amount of about 0.1 to about 10 wt % of the total weight of the coating composition; and wherein the foam substrate and at least one layer of intumescent coating satisfy the acceptance criteria of Section 803.2.1 of the 2006 International Building Code when tested in accordance with NFPA 286.

2. The system of claim 1, wherein the foam substrate is a plastic foam substrate.

3. The system of claim 2, wherein the plastic foam substrate is selected from the group consisting of polyurethane foam, polyisocyanurate foam, polyurethane-modified polyisocyanurate foam, expanded polystyrene foam, extruded polystyrene foam, polyethylene foam and silicone foam.

4. The system of claim 2, wherein the plastic foam substrate is foamed by a foaming agent selected from the group consisting of a chlorofluorocarbon, a hydrofluorocarbon and pentane.

5. The system of claim 2, wherein the plastic foam substrate is water-blown.

6. The system of claim 2, wherein the plastic foam substrate is a rigid spray-applied polyurethane foam with a density of about 1.8 to about 7.0 pcf.

7. The system of claim 6, wherein the plastic foam substrate is a rigid spray-applied polyurethane foam with a density of about 1.8 to about 3.5 pcf.

8. The system of claim 2, wherein the plastic foam substrate is a rigid spray-applied polyurethane foam with a density of about 0.5 to about 1.8 pcf.

9. The system of claim 1, wherein the catalyst includes at least ammonium polyphosphate, the carbonific includes at least a polyhydric alcohol, and the blowing agent includes at least melamine.

10. The system of claim 9, wherein the blowing agent includes at least a chlorinated paraffin wax.

11. The system of claim 1, wherein at least 90% of expandable graphite particles have average particle sizes of about 10 to about 500 micrometers, and wherein the expandable graphite particles have a maximum expansion ratio of about 100 to about 200 cc/g as measured at 950° C.

12. The system of claim 1, wherein the expandable graphite is present in an amount of about 0.5 to about 10 wt % of the total weight of the coating composition.

13. The system of claim 12, wherein the expandable graphite is present in an amount of about 1 to about 5 wt % of the total weight of the coating composition.

14. The system of claim 1, wherein the dry film thickness of the layer of intumescent coating is about 5 to about 100 mil.

15. The system of claim 14, wherein the dry film thickness of the layer of intumescent coating is about 5 to about 40 mil.

16. The system of claim 1, wherein the blowing agent includes at least two blowing agents having different decomposition temperatures.

17. The system of claim 16, wherein the at least two blowing agents include at least one nitrogen-containing blowing agent and at least one chlorine-containing blowing agent.

18. The system of claim 17, wherein the at least one nitrogen-containing blowing agent includes melamine and the at least one chlorine-containing blowing agent includes chlorinated paraffin wax.

19. The system of claim 1, wherein the foam substrate and at least one layer of intumescent coating passes UL-1715, UBC-26-3, and FM 4880 large scale room corner fire tests.

20. The system of claim 1, wherein the surfactant is a nonionic surfactant.

21. A heat and fire resistant system, comprising:
a rigid plastic foam substrate having a density of about 0.5 to about 3.5 pcf; wherein the plastic foam substrate is selected from the group consisting of polyurethane, polyisocyanurate and polystyrene foam; and
at least one layer of an intumescent coating having a dry film thickness of about 5 to about 25 mil directly applied to at least one surface of the foam substrate, the intumescent coating consisting essentially of:
(a) an intumescent catalyst selected from the group consisting of diammonium phosphate, ammonium polyphosphate and monoammonium phosphate wherein the intumescent catalyst is present in an amount of about 20 to about 30 wt % of the coating composition;
(b) a carbonific selected from the group consisting of pentaerythritol, dipentaerythritol and chlorinated paraffin wax, wherein the carbonific is present in an amount of about 5 to about 15 wt % of the coating composition;
(c) a melamine blowing agent, wherein the blowing agent is present in an, amount of about 5 to about 20 wt % of the coating composition;
(d) expandable graphite, wherein the expandable graphite is present in an amount of about 0.5 to about 10 wt % of the coating composition;
(e) a latex binder, wherein the latex binder, free of thermoplastic polymers, has a polymer particle diameter of about 0.001 to about 10 µm and is present in an amount of about 10 to about 30 wt % of the coating composition; and
(f) a surfactant;

wherein the foam substrate and at least one layer of intumescent coating satisfy the acceptance criteria of Section 803.2.1 of the 2006 international Building Code when tested in accordance with NFPA 286.

22. The system of claim 21, wherein the surfactant is a nonionic surfactant.

23. A heat and fire resistant system, comprising:
a foam substrate; and
at least one layer of an intumescent coating directly applied to at least one surface of the foam substrate, the intumescent coating consisting essentially of: an intumescent catalyst, a carbonific, a blowing agent, expandable graphite, a surfactant, a mold inhibitor, and a latex binder,
wherein the intumescent catalyst is present in an amount of about 1 to about 60 wt % of the total weight of the coating composition, the intumescent catalyst selected from the group consisting of monoammonium phosphate, diammonium phosphate, monopotassium phosphate, ammonium polyphosphate, ammonium borate, ammonium sulfate, metaphosphoric acid, orthophosphoric acid, pyrophosphoric acid, hypophosphorous acid, melamine phosphate, melamine pyrophosphate, melamine polyphosphate, urea phosphate, and combinations thereof;
wherein the carbonific is present in an amount of about 1 to about 50 wt % of the total weight of the coating composition, the carbonific selected from the group consisting of polyhydric alcohol, polyhydric compounds, polyols, polysaccharides, starches, dextrins, sugar alcohols, reducing sugars, hexane hexols, pentane pentols, mannitol, sorbitol, dulictol, inositol, arabitol, pentaerythritol, dipentaerythritol, tripentaerythritol, sucrose, glucose, maltose, erythritol, dextrose, and combinations thereof;
wherein the blowing agent is present in an amount of about 0.1 to about 50 wt % of the total weight of the coating composition, the blowing agent selected from the group consisting of melamine, melamine cyanurate, dicyandiamide, urea, dimethylurea, guanidine, cyanoguanidine, glycine, chlorinated paraffin wax, alumina trihydrate, magnesium hydroxide, zinc borate hydrate, and combinations thereof;
wherein the latex binder, free of thermoplastic polymers, has a polymer particle diameter of about 0.001 to about 10 μm and is present in an amount of about 1 to about 50 wt % of the total weight of the coating composition;
wherein the expandable graphite is present in an amount of about 0.1 to about 10 wt % of the total weight of the coating composition; and
wherein the foam substrate and at least one layer of intumescent coating satisfy the acceptance criteria of Section 803.2.1 of the 2006 International Building Code when tested in accordance with NFPA 286.

24. The system of claim 23, wherein the surfactant is a nonionic surfactant.

25. A method for rendering a foam substrate resistant to heat and fire, comprising:
(a) applying at least one layer of intumescent coating composition directly onto at least one surface of the foam substrate; the intumescent coating composition consisting essentially of an intumescent catalyst, a carbonific, a blowing agent, expandable graphite, a surfactant and a latex binder,
wherein the intumescent catalyst is present in an amount of about 1 to about 60 wt % of the total weight of the coating composition, the intumescent catalyst selected from the group consisting of monoammonium phosphate, diammonium phosphate, monopotassium phosphate, ammonium polyphosphate, ammonium borate, ammonium sulfate, metaphosphoric acid, orthophosphoric acid, pyrophosphoric acid, hypophosphorous acid, melamine phosphate, melamine pyrophosphate, melamine polyphosphate, urea phosphate, and combinations thereof;
wherein the carbonific is present in an amount of about 1 to about 50 wt % of the total weight of the coating composition, the carbonific selected from the group consisting of polyhydric alcohol, polyhydric compounds, polyols, polysaccharides, starches, dextrins, sugar alcohols, reducing sugars, hexane hexols, pentane pentols, mannitol, sorbitol, dulictol, inositol, arabitol, pentaerythritol, dipentaerythritol, tripentaerythritol, sucrose, glucose, maltose, erythritol, dextrose, and combinations thereof;
wherein the blowing agent is present in an amount of about 0.1 to about 50 wt % of the total weight of the coating composition, the blowing agent selected from the group consisting of melamine, melamine cyanurate, dicyandiamide, urea, dimethylurea, guanidine, cyanoguanidine, glycine, chlorinated paraffin wax, alumina trihydrate, magnesium hydroxide, zinc borate hydrate, and combinations thereof;
wherein the latex binder, free of thermoplastic polymers, has a polymer particle diameter of about 0.001 to about 10 μm and is present in an amount of about 1 to about 50 wt % of the total weight of the coating composition;
wherein the expandable graphite is present in an amount of about 0.1 to about 10 wt % of the total weight of the coating composition; and
(b) allowing the intumescent coating to dry on the foam substrate,
wherein the foam substrate and at least one layer of intumescent coating satisfy the acceptance criteria of Section 803.2.1 of the 2006 International Building Code when tested in accordance with NFPA 286.

26. The method of claim 25, wherein the foam substrate is a plastic foam substrate.

27. The method of claim 26, wherein the plastic foam substrate is selected from the group consisting of polyurethane foam, polyisocyanurate foam, polyurethane modified polyisocyanurate foam, expanded polystyrene foam, extruded polystyrene foam, polyethylene foam and silicone foam.

28. The method of claim 26, further comprising foaming the plastic foam substrate with a foaming agent selected from the group consisting of a chlorofluorocarbon, a hydrofluorocarbon and pentane.

29. The method of claim 26, wherein the plastic foam substrate is a rigid spray-applied polyurethane foam with a density of about 0.5 to about 1.8 pcf.

30. The method of claim 26, wherein the dry film thickness of the layer of intumescent coating is about 5 to about 100 mil.

31. The method of claim 30, wherein the dry film thickness of the layer of intumescent coating is about 5 to about 40 mil.

32. The method of claim 26, wherein the plastic foam substrate is water-blown.

33. The method of claim 26, wherein the plastic foam substrate is a rigid spray-applied polyurethane foam with a density of about 1.8 to about 7.0 pcf.

34. The method of claim 33, wherein the plastic foam substrate is a rigid spray-applied polyurethane foam with a density of about 1.8 to about 3.5 pcf.

35. The method of claim 25, wherein the catalyst includes at least ammonium polyphosphate, the carbonific includes at least a polyhydric alcohol, and the blowing agent includes at least melamine.

36. The method of claim 35, wherein the intumescent coating further comprises a chlorinated paraffin wax.

37. The method of claim 25, wherein at least 90% of expandable graphite particles have average particle sizes of about 10 to about 500 micrometers, and wherein the expandable graphite particles have a maximum expansion ratio of about 100 to about 200 cc/g.

38. The method of claim 25, wherein the expandable graphite is present in an amount of about 0.5 to about 10 wt % of the total weight of the coating composition.

39. The method of claim 25, wherein the expandable graphite is present in an amount of about 1 to about 5 wt % of the total weight of the coating composition.

40. The method of claim 25, wherein the intumescent coating composition comprises at least two blowing agents having different decomposition temperatures.

41. The method of claim 40, wherein the at least two blowing agents include at least one nitrogen-containing blowing agent and at least one chlorine-containing blowing agent.

42. The method of claim 41, wherein the at least one nitrogen-containing blowing agent includes melamine and the at least one chlorine-containing blowing agent includes chlorinated paraffin wax.

43. The method of claim 25, wherein the coating composition is applied by spraying the coating composition onto at least one surface of the foam substrate.

\* \* \* \* \*